United States Patent [19]

Wada

[11] Patent Number: 4,957,697
[45] Date of Patent: Sep. 18, 1990

[54] NUCLEAR FUEL ROD SUPPORT GRID WITH GENERALLY S-SHAPED SPRING STRUCTURES

[75] Inventor: Norio Wada, Ibaraki, Japan

[73] Assignee: Westinghouse Electric Corp., Pittsburgh, Pa.

[21] Appl. No.: 241,427

[22] Filed: Sep. 6, 1988

[30] Foreign Application Priority Data

Sep. 10, 1987 [JP] Japan .................................. 62-227169

[51] Int. Cl.⁵ ................................................. G21C 3/34
[52] U.S. Cl. ...................................... 376/442; 376/438
[58] Field of Search ........................ 376/438, 441, 442

[56] References Cited

U.S. PATENT DOCUMENTS

| | | | |
|---|---|---|---|
| 3,070,534 | 12/1962 | Kooistra | 204/193.2 |
| 3,646,994 | 3/1972 | Piepers et al. | 165/69 |
| 3,679,547 | 7/1972 | Warberg | 176/78 |
| 3,795,040 | 3/1974 | Jabsen | 29/433 |
| 3,928,131 | 12/1975 | Wachter et al. | 176/78 |
| 3,933,584 | 1/1976 | Litt | 176/78 |
| 4,061,536 | 12/1977 | Creagan et al. | 176/78 |
| 4,090,918 | 5/1978 | Masetti | 176/78 |
| 4,160,477 | 7/1979 | Roffler | 376/442 |
| 4,224,107 | 9/1980 | Delafosse | 376/442 |
| 4,426,355 | 1/1984 | Burger | 376/442 |
| 4,492,844 | 1/1985 | Kobuck et al. | 219/121 |
| 4,585,616 | 4/1986 | DeMario et al. | 376/442 |
| 4,702,881 | 10/1987 | Welland et al. | 376/442 |
| 4,803,043 | 2/1989 | DeMario | 376/442 |

FOREIGN PATENT DOCUMENTS

| | | |
|---|---|---|
| 1961035 | 6/1971 | Fed. Rep. of Germany . |
| 1497083 | 8/1967 | France . |
| 61-90085 | 5/1986 | Japan . |

Primary Examiner—Donald P. Walsh

[57] ABSTRACT

A nuclear fuel assembly support grid includes a multiplicity of spring structures for engaging fuel rods extending through the cells of the grid. Each spring structure is formed on each cell wall section to form a matrix of fuel rod receiving cells in the grid. Each spring structure is composed of a pair of spaced apart upper and lower opposite outer portions being integrally attached at their outer ends to the respective wall section, and a middle portion disposed between in laterally spaced relation from the outer portions and integrally connected at its outer ends with respective inner ends of the outer portions. The integrally-connected outer and middle portions are defined by a pair of generally U-shaped slots formed in a reverse interlocking relation to one another in the wall section of the one cell. The outer and middle portions define a generally S-shaped configuration which protrudes to one side of the wall section so that the spring structure gradually increases in height relative to the wall section from the outer portions inwardly to the middle portion with the spring structure being at maximum distance from the wall section at a central fuel rod-engaging region of the middle portion.

15 Claims, 4 Drawing Sheets

NUCLEAR FUEL ROD SUPPORT GRID WITH GENERALLY S-SHAPED SPRING STRUCTURES

CROSS REFERENCE TO RELATED APPLICATIONS

Reference is hereby made to the following application dealing with related subject matter and assigned to the assignee of the present invention: "Nuclear Fuel Rod Support Grid With Attachable Spring And Dimple Support Spacers And Method Of Assembling A Fuel Assembly" by Bungo Yokoyama, assigned U.S. Ser. No. 186,274 and filed April 26, 1988. (W.E. 54,682)

BACKGROUND OF THE INVENTION

1. Field of the Invention

The present invention relates generally to nuclear fuel assemblies for nuclear reactors and, more particularly, is concerned with a nuclear fuel rod grid having unique fuel rod engaging spring structures.

2. Description of the Prior Art

In most nuclear reactors, the reactor core is comprised of a large number of elongated fuel assemblies. Conventional designs of these fuel assemblies include a plurality of fuel rods held in an organized array by a plurality of grids spaced axially along the fuel assembly length and attached to a plurality of elongated control guide thimbles of the fuel assembly. Top and bottom nozzles on opposite ends of the fuel assembly are secured to the guide thimbles which extend slightly above and below the ends of the fuel rods.

The grids of the fuel assembly as well known in the art are used to precisely maintain the spacing between the nuclear fuel rods in the reactor core, prevent rod vibration, provide lateral support for the fuel rods, and, to some extent, frictionally clamp and retain the rods against longitudinal movement.

One popular conventional fuel rod support grid design, being illustrated and described in U.S. Pat. No. 4,492,844 to Kobuck et al, includes a multiplicity of interleaved inner and outer belt-shaped straps having an egg-crate configuration forming a multiplicity of cells which individually accept the nuclear fuel rods and control rod guide thimbles. The cells of each grid which accept and support the fuel rods at a given axial location therealong typically use relatively resilient springs and/or relatively rigid protrusions (called dimples) formed directly into the metal of the interleaved straps. The springs and dimples of each grid cell frictionally engage or contact the respective fuel rod extending through the cell and together apply a clamping force directed generally perpendicular to the axial direction of the fuel rod. Additionally, the outer straps are attached together and peripherally enclose the inner straps to impart strength and rigidity to the grid.

However, several drawbacks arise from this particular grid design. The vertical orientation and configuration of the fuel rod engaging springs require that the springs and thus the grid be of substantial height in order for the springs to have the desired amount of resiliency and elastic deformation to function properly. There are limits to the amount by which the height of the springs and the grid can be increased to increase the elastic deformation. Furthermore, the most common material used for the support grid is Zircaloy which has a small absorption cross section for thermal neutrons but also has low elastic strength. However, increasing the grid height to increase spring height and thereby its elastic deformation, not only increases the amount of parasitic structural material utilized in the fuel assembly but also requires increase in thickness of the grid straps in order to increase rigidity from the point of view of mechanical strength. The flow path of the cooling water is then narrowed by the amount of the increase in thickness, resulting in an increase in pressure drop through the fuel assembly.

Representative of other prior art grid designs are the ones described and illustrated in U.S. patents to Kooistra (3,070,534), Wachter et al (3,928,131) and Piepers et al (3,646,994); French Patent No. 1,497,083; West German Patent No. 1,961,035; and Japanese Patent No. 61-90085. While all of these grids may function satisfactorily and generally achieve the objectives for which they were designed, none would appear to suggest an approach which will satisfactorily overcome the aforementioned drawbacks of the one conventional grid design briefly described above. Consequently, a need still exists for an improved grid spring structure which will avoid the above drawbacks without presenting new ones in their place.

SUMMARY OF THE INVENTION

The present invention provides a fuel rod support grid designed to satisfy the aforementioned needs. The support grid of the present invention includes inner grid straps containing unique fuel rod engaging spring structures on wall sections thereof defining a matrix of fuel rod receiving grid cells. Each spring structure is of a generally S-shaped configuration which protrudes to one side of the wall section so that the surfaces of the spring structure gradually increase in height relative to the wall section from opposite end portions of the spring structure where it attaches to the wall section, inwardly to the central portion of the spring structure. Each spring structure is formed by punching out two U-shaped slots arranged in a reverse interlocking relationship to one another.

The total length of the spring and thereby the amount of elastic deformation are increased by the S-shaped configuration of the spring without concentration of stresses at the location of the spring. A space is formed between the spring and the grid strap which serves as a passage for the coolant flowing through the grid cell, offsetting an pressure drop increase due to the use of Zircaloy material of increased thickness.

Accordingly, the present invention is directed to a plurality of fuel rod engaging spring structures in a nuclear fuel rod grid. The grid includes a plurality of inner and outer straps being interleaved with one another to form a matrix of hollow cells, each cell for receiving one fuel rod and being defined by pairs of opposing wall sections of the straps which wall sections are shared with adjacent cells. Each cell has a central longitudinal axis. Each fuel rod engaging spring structure made of resiliently yieldable material and integrally formed on each wall section of the inner straps, includes: (a) a pair of spaced apart opposite outer portions being integrally attached at their outer ends to the respective wall section, the outer portions extending in generally transverse relation to the direction of the central longitudinal axis of the one cell; and (b) a middle portion disposed between in laterally spaced relation from and integrally connected at its outer ends with respective inner ends of the outer portions, the middle portion extending in generally transverse relation to the direction of the central longitudinal axis of the one cell. The inner ends of the outer portions and the outer ends of the middle portion have generally arcuate configurations.

More particularly, the outer portions and the middle portion extend in directions which are generally parallel to one another and generally perpendicular to the central longitudinal axis of the one cell. Also, the outer portions extend in generally oppositely inclined relation placing the middle portion at a greater height from the wall section than the outer portions. In one embodiment, the outer ends of the middle portion extend in generally opposite inclined relation toward one another. In another embodiment, the outer ends of the middle portion extend in generally opposite arcuate relation toward one another. However, in both embodiments, the middle portion has a central region for engaging a fuel rod and which extends in generally planar relation between and interconnects with the outer ends.

Further, the integrally-connected outer and middle portions of the spring structure are defined by a pair of generally U-shaped slots formed in a reverse interlocking relation to one another in the wall section of the one cell. The outer and middle portions define a generally S-shaped configuration which protrudes to one side of the wall section so that the spring structure gradually increases in height relative to the wall section from the outer portions inwardly to the middle portion with the spring structure being at maximum height from the wall section at the central fuel rod-engaging region of the middle portion.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

In the following description, like references characters designate like or corresponding parts throughout the several views. Also in the following description, it is to be understood that such terms as "forward", "rearward", "left", "right", "upwardly", "downwardly", and the like, are words of convenience and are not to be construed as limiting terms.

In General

Figure 1:
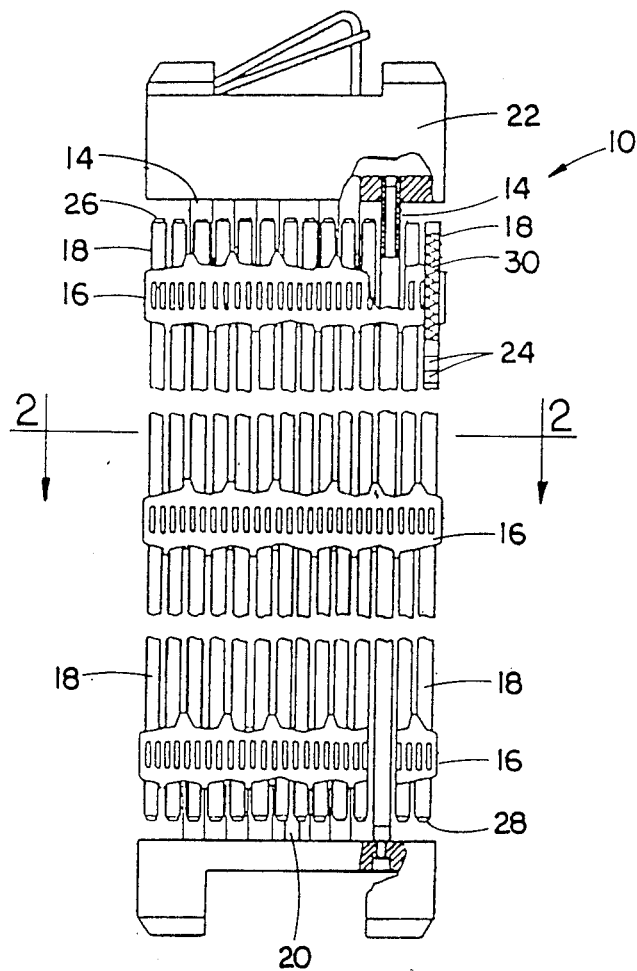
FIG. 1 is an elevational view, partly in section, of a fuel assembly which employs a fuel rod support grid having the spring structure of the present invention, the assembly being, illustrated in vertically foreshortened form with parts broken away for clarity.
Figure 8:
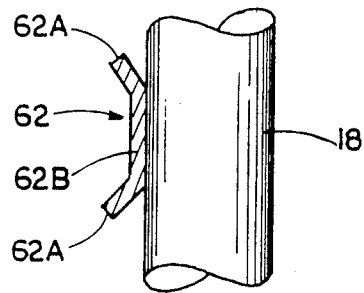
FIG. 8 is an enlarged fragmentary sectional view taken along line 8—8 of FIG. 6 illustrating a cross-sectional configuration of the middle portion of the spring structure where it engages a fuel rod.
Figure 9:
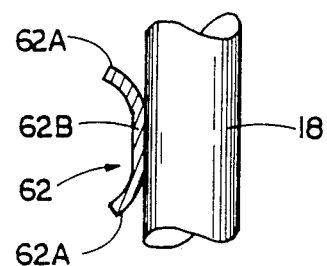
FIG. 9 is a view similar to that of FIG. 8 illustrating an alternative cross-sectional configuration of the spring structure middle portion.
Figure 2:
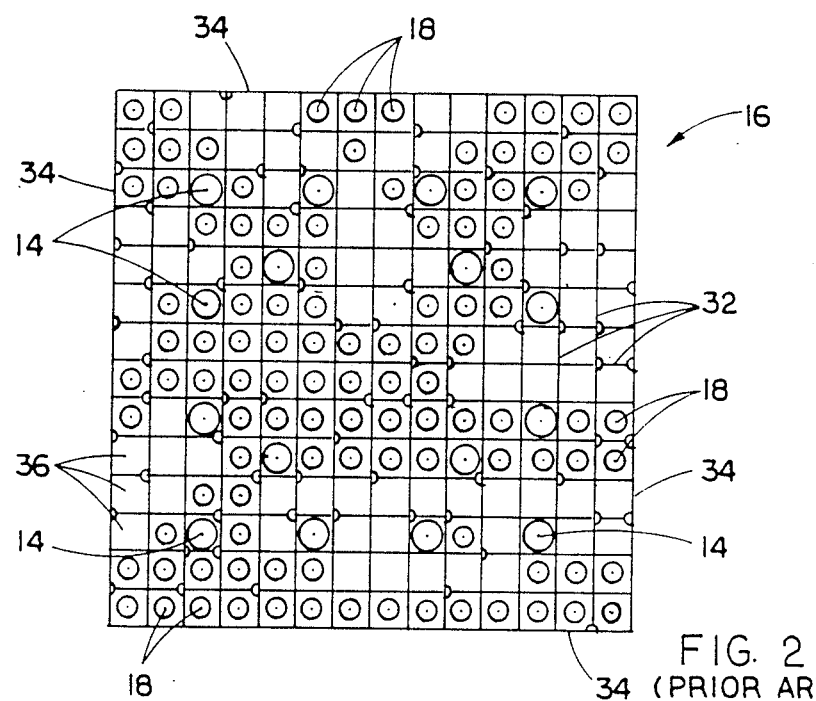
FIG. 2 is an enlarged plan view of one of the prior art support grids of the fuel assembly of FIG. 1.
Figure 3:
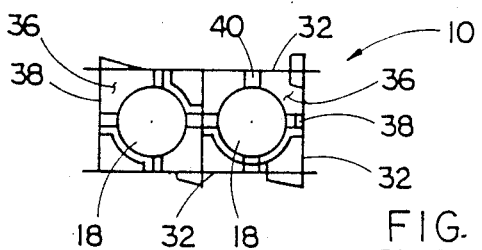
FIG. 3 is an enlarged fragmentary top plan view of the prior art support grid of FIG. 2, illustrating portions of interleaved grid straps defining a pair of cells of the support grid.

Referring now to the drawings, and particularly to FIG. 1, there is shown an elevational view of a fuel assembly, represented in vertically foreshortened form and being generally designated by the numeral 10. The fuel assembly 10 is the type used in a pressurized water reactor (PWR) and basically includes a lower end structure or bottom nozzle 12 for supporting the assembly on the lower core plate (not shown) in the core region of a reactor (not shown), and a number of longitudinally extending guide tubes or thimbles 14 which project upwardly from the bottom nozzle 12. The assembly 10 further includes a plurality of transverse grids 16 constructed in accordance with the principles of the present invention, as will be described in detail below. The grids 16 are axially spaced along and supported by the guide thimbles 14. The assembly 10 also includes a plurality of elongated fuel rods 18 transversely spaced and supported in an organized array by the grids 16. Also, the assembly 10 has an instrumentation tube 20 located in the center thereof and an upper end structure or top nozzle 22 attached to the upper ends of the guide thimbles 14. With such arrangement of parts, the fuel assembly 10 forms an integral unit capable of being conveniently handled without damaging the assembly parts.

As mentioned above, the fuel rods 18 in the array thereof in the assembly 10 are held in spaced relationship with one another by the grids 16 spaced along the fuel assembly length. Each fuel rod 18 includes nuclear fuel pellets 24 and the opposite ends of the rod are closed by upper and lower end plugs 26, 28 to hermetically seal the rod. Commonly, a plenum spring 30 is disposed between the upper end plug 26 and the pellets 24 to maintain the pellets in a tight, stacked relationship within the rod 18. The fuel pellets 24 composed of fissile material are responsible for creating the reactive power of the PWR. A liquid moderator/coolant such as water, or water containing boron, is pumped upwardly through the fuel assemblies of the core in order to extract heat generated therein for the production of useful work.

To control the fission process, a number of control rods (not shown) are reciprocally movable in the guide thimbles 14 located at predetermined positions in the fuel assembly 10. Specifically, the top nozzle 22 has associated therewith a rod cluster control mechanism (not shown) with a plurality of radially extending arms (not shown). Each arm is interconnected to a control rod such that the control mechanism is operable to move the control rods vertically in the guide thimbles 14 to thereby control the fission process in the fuel assembly 10, all in a well-known manner.

Referring to FIGS. 2–5, each fuel rod support grid 16 includes a multiplicity of interleaved inner and outer belt-shaped straps 32, 34. The outer straps 34 are attached together and peripherally enclose the inner straps 32 to impart strength and rigidity to the grid 16 and provide it with a lattice or egg-crate configuration forming a multiplicity of lattice spaces or cells 36 which individually accept the nuclear fuel rods 18 and control rod guide thimbles 14.

The cells 36 of each grid 16 will accept and support the fuel rods 18 at a given axial location therealong typically use relatively resilient springs 38 and relatively rigid protrusions or dimples 40 formed directly into the metal of the interleaved straps 32, 34. The springs 38 and dimples 40 of each grid cell 16 protrude into the cell and frictionally engage or contact the respective fuel rod 18 extending through the cell and together apply a clamping force directed generally perpendicular to the axial direction of the fuel rod 18.

Figure 4:
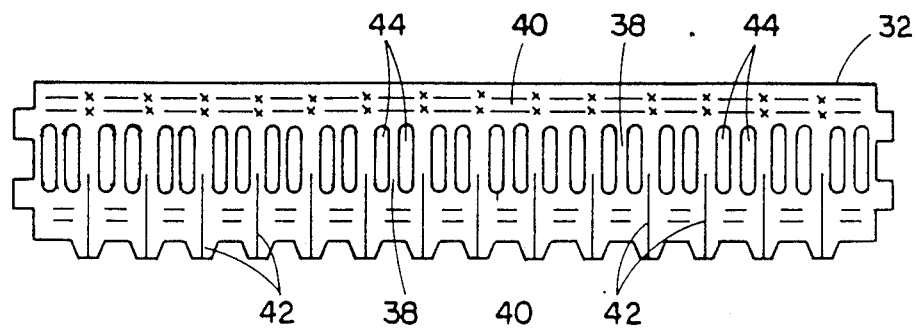
FIG. 4, is a fragmentary elevational view of one of the inner straps of the grid of FIG. 2 removed from the grid.
Figure 5:
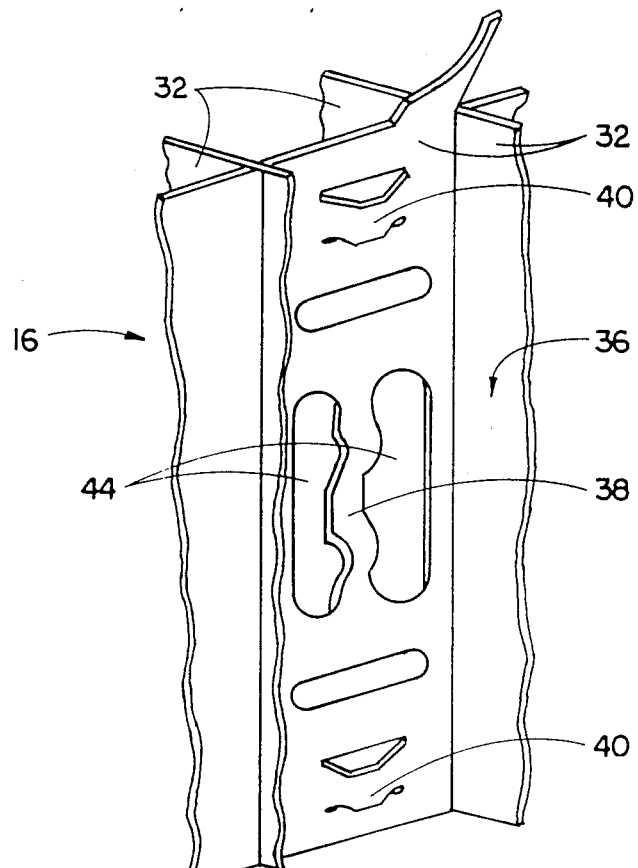
FIG. 5 is an enlarged fragmentary perspective view of the dimple and spring structures integrally formed on one of the wall sections of a cell of the grid of FIG. 2.

Referring to FIGS. 4 and 5, it is seen that in the inner strap 32 of the grid 16, many slits 42 are cut through the rectangular shaped, thin heat-resistant alloy plate (e.g. material such as Inconnel 718) forming the strap 32, in a direction perpendicular to the length of the strap, and the springs 38 are formed between and above the slits 42 by punching out slots 44 in the strap. Indented and extended portions are also formed in the spring 38. The dimples 40 are formed by extruding parts of the areas located above and below the springs 38 away from one side of the strap 32.

Grids With Generally S-Shaped Spring Structures

Referring to FIGS. 6–9, there is shown in fragmentary form a preferred embodiment of a fuel rod support grid 46 constructed in accordance with the principles of the present invention. Like the prior art grid 16 of FIGS. 1–5, the support grid 46 has a plurality of interleaved inner straps 48 surrounded and interconnected by outer straps (not shown) to form a multiplicity or matrix of lattice spaces or hollow cells 50 defined by wall sections 52 of the straps 48 which individually accept the fuel rods 18 and guide thimbles 14 therethrough. The support grid has pairs of dimples 54 formed on each of the wall sections 52 of the straps 48 substantially as in the prior art grid 16.

However, the support grid 46 has a spring structure 56 formed o each wall section 52 of the straps 48 which is improved over the springs 38 of the prior art grid 16. Basically, each spring structure 54, being made of resiliently yieldable material and integrally formed on each wall section 52 of the inner straps 48, includes a pair of spaced apart upper and lower opposite outer portions 58,60 and a middle portion 62. The upper and lower outer portions 58,60 are integrally attached only at their outer ends 58A,60A to the respective wall section 52. The middle portion 62 is disposed between and in laterally spaced relation from and integrally connected at its outer ends 62A with the respective inner ends 58B,60B of the upper and lower outer portions 58,60. The outer and inner ends 60A,60B of the lower outer portion 60 are located in positions which are the reverse of the outer and inner ends 58A,58B of the upper outer portion 58. By being integrally attached only at their outer ends 58A,60A to the respective wall section 52, the upper and lower outer portions 58,60 thereby define a pair of opposite ends of the spring structure 54 being the only locations at which the spring structure 54 is attached to the respective wall section 52. The inner ends 58B,60B of the upper and lower outer portions 58,60 and the outer ends 62A of the middle portion 62 have generally arcuate configurations. The upper and lower outer portions 58,60 and the middle portion 62 extend in generally transverse relation to the direction of the central longitudinal axis A of the one cell 50.

Figure 7:
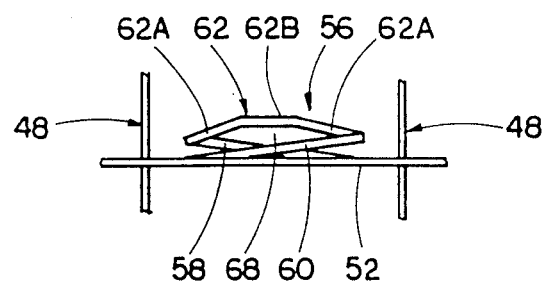
FIG. 7 is a fragmentary bottom plan view as seen along line 7—7 of FIG. 6 illustrating the inclined, gradually increasing height of the spring structure progressing from its outer portions to its middle portion.

More particularly, the upper and lower outer portions 58,60 and the middle portion 62 of the spring structure 56 extend in directions which are generally parallel to one another and generally perpendicular to the central longitudinal axis A of the one cell 50. Also, as best seen in FIG. 7, the upper and lower outer portions 58,60 extend in generally oppositely inclined relation, placing the middle portion 62 at a greater height, or distance, from the wall section 52 than the outer portions 58,60. In one embodiment shown in FIG. 8, the outer ends 62A of the middle portion 62 extend in generally opposite inclined relation toward one another, anywhere from zero to sixty degrees. In another embodiment shown in FIG. 9, the outer ends 62A of the middle portion 62 extend in generally opposite arcuate relation toward one another. However, in both embodiments, the middle portion 62 has a central region 62B for engaging the fuel rod 18 which extends through the grid cell 50. The central region 62B extends in generally planar relation between and interconnects with the outer ends 62A. These configurations of the middle portion 62 have the effect of minimizing scratching for the fuel rod surface when it is inserted through the cell 50 and provide suitable rigidity in the middle portion.

Figure 6:
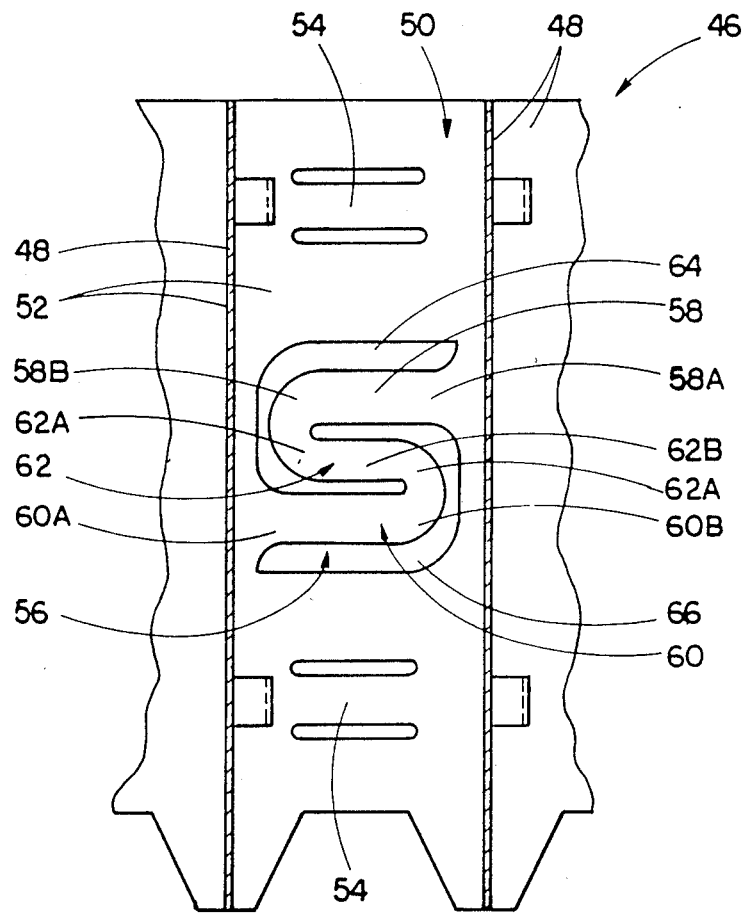
FIG. 6 is an enlarged fragmentary longitudinal sectional view of a cell of a support grid employing the spring structure of the present invention.

Further, as best seen in FIG. 6, the integrally-connected upper and lower outer portions 58,60 and middle portion 62 of the spring structure 56 are defined by a pair of generally U-shaped upper and lower slots 64,66 formed in a reversed, facing and interlocking relation to one another in the wall section 52 of the one cell 50. In such manner, the slots 64,66 form the upper and lower outer portions 58,60 and the middle portion 62 in an overall symmetrical generally S-shaped configuration which protrudes to one side of the wall section 52 so that the spring structure 56 gradually increases in height relative to the wall section 52 from the outer portions 58,60 inwardly to the middle portion 62 with the spring structure 56 being at maximum height from the wall section 52 at the central fuel rod-engaging region 62B of the middle portion 62.

The characterization of the configuration of the spring structure 56 as being generally S-shaped is not meant to limit it solely to the letter "S", but it can be other shapes, such as "Z" or "2" etc, as long as these configurations provide a sufficient length for the spring structure, provide the spring structure with increasing height from its outer portions 58,60 to its middle portion 62, and provide the spring structure 56 with an approximately symmetrical relationship of its outer portions to its middle portion.

The total length of the spring structure 56 and thereby the amount of elastic deformation are increased by the S-shaped configuration thereof without any concentration of stresses at the location of the spring structure. As seen in FIG. 7, a space 68 is formed between the spring structure 5 and the grid strap 48 which serves as a passage for the coolant flowing through the grid cell 50, offsetting an pressure drop increase due to the use of Zircaloy material of increased thickness.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

I claim:

1. In a nuclear fuel rod grid including a plurality of inner and outer straps being interleaved with one another to form a matrix of hollow cells, each cell for receiving one fuel rod and being defined by pairs of opposing wall sections of said straps which wall sections are shared with adjacent cells, each cell having a central longitudinal axis, a fuel rod engaging spring structure of resiliently yieldable material being integrally formed on each wall section of said inner straps, said spring structure comprising:

(a) a pair of spaced apart opposite outer portions, each outer portion having an inner end and an outer end, said inner and outer ends of one outer portion being located the reverse of said inner and outer ends of the other outer portion, said outer portions being integrally attached only at their outer ends to said respective wall section so as to define a pair of opposite ends of said spring structure being the only locations at which said spring structure is attached to said respective wall section, said outer portions extending in generally transverse relation to the direction of said central longitudinal axis of said one cell; and (b) a middle portion having a pair of outer ends and being disposed between and in laterally spaced relation from said outer portions, said middle portion being integrally connected at its outer ends with respective inner ends of said outer portions and extending in generally transverse relation to the direction of said central longitudinal axis of said one cell;

(c) said inner ends of said outer portions and said outer ends of said middle portion having generally arcuate configurations.

2. The spring structure as recited in claim 1, wherein said outer portions and said middle portions extend in directions which are generally parallel to one another and generally perpendicular to said central longitudinal axis of said one cell.

3. The spring structure as recited in claim 1, wherein said outer portions extend in generally oppositely inclined relation.

4. The spring structure as recited in claim 1, wherein said outer portions and said middle portion are defined by a pair of generally U-shaped slots formed in a reverse interlocking relation to one another in said wall section of said one cell.

5. The spring structure as recited in claim 1, wherein said middle portion is at a greater height from said wall section than said outer portions.

6. The spring structure as recited in claim 1, wherein said outer portions and middle portion define a generally S-shaped configuration which protrudes to one side of said wall section so that said spring structure gradually increases in height relative to said wall section from said outer portions inwardly to said middle portion.

7. The spring structure as recited in claim 1, wherein said outer ends of said middle portion extend in generally opposite inclined relation toward one another and said middle portion also includes a central region for engaging a fuel rod and which extends in generally planar relation between and interconnects with said inclined outer ends.

8. The spring structure as recited in claim 1, wherein said outer ends of said middle portion extend in generally opposite arcuate relation toward one another and said middle portion also includes a central region for engaging a fuel rod and which extends in generally planar relation between and interconnects with said arcuate outer ends.

9. In a nuclear fuel rod grid including a plurality of inner and outer straps being interleaved with one another to form a matrix of hollow cells, each cell for receiving one fuel rod and being defined by pairs of opposing wall sections of said straps which wall sections are shared with adjacent cells, each cell having a central longitudinal axis, a fuel rod engaging spring structure of resiliently yieldable material being integrally formed on each wall section of said inner straps, said spring structure comprising:

(a) a pair of spaced apart opposite upper and lower opposite outer portions, each upper and lower outer portion having an inner end and an outer end, said inner and outer ends of one outer portion being located the reverse of said inner and outer ends of the other outer portion, said upper and lower outer portions being integrally attached only at their outer ends to said respective wall section so as to define a pair of opposite ends of said spring structure being the only locations at which said spring structure is attached to said respective wall section, said upper and lower outer portions extending in generally transverse relation to the direction of said central longitudinal axis of said one cell; and (b) a middle portion having a pair of outer ends and being disposed between and in laterally spaced relation from said upper and lower outer portions, said middle portion being integrally connected at its outer ends with respective inner ends of said upper and lower outer portions and extending in generally transverse relation to the direction of said central longitudinal axis of said one cell;

(c) said inner ends of said upper and lower outer portions and said outer ends of said middle portion having generally arcuate configurations;

(d) said upper and lower outer portions and said middle portion together defining a generally S-shaped configuration which protrudes to one side of said wall section so that said spring structure gradually increases in height relative to said wall section from said upper and lower outer portions inwardly to said middle portion.

10. The spring structure as recited in claim 9, wherein said upper and lower outer portions and said middle portions extend in directions which are generally parallel to one another and generally perpendicular to said central longitudinal axis of said one cell.

11. The spring structure as recited in claim 9, wherein said upper and lower outer portions extend in generally oppositely inclined relation.

12. The spring structure as recited in claim 9, wherein said upper and lower outer portions and said middle portion are defined by a pair of generally U-shaped slots formed in a reverse interlocking relation to one another in said wall section of said one cell.

13. The spring structure as recited in claim 9, wherein said middle portion is at a greater height from said wall section than said upper and lower outer portions.

14. The spring structure as recited in claim 9, wherein said outer ends of said middle portion extend in generally opposite inclined relation toward one another and said middle portion also includes a central region for engaging a fuel rod and which extends in generally planar relation between and interconnects with said inclined outer ends.

15. The spring structure as recited in claim 9, wherein said outer ends of said middle portion extend in generally opposite arcuate relation toward one another and said middle portion also includes a central region for engaging a fuel rod and which extends in generally planar relation between and interconnects with said arcuate outer ends.

* * * * *